(12) United States Patent
Baxter

(10) Patent No.: US 7,043,224 B1
(45) Date of Patent: May 9, 2006

(54) COMMUNICATION APPARATUS

(76) Inventor: Paula Michele Baxter, 913 E. Elm St., Compton, CA (US) 90221

( * ) Notice: Subject to any disclaimer, the term of this patent is extended or adjusted under 35 U.S.C. 154(b) by 532 days.

(21) Appl. No.: 10/209,049

(22) Filed: Jul. 30, 2002

Related U.S. Application Data

(60) Provisional application No. 60/308,464, filed on Jul. 30, 2001.

(51) Int. Cl.
*H04M 9/00* (2006.01)

(52) U.S. Cl. ............ 455/401; 455/67.11; 455/575.1

(58) Field of Classification Search ............ 455/453, 455/3.05, 456.1, 404.1, 404.2, 419, 420, 455/88, 67.11, 575.1, 575.6; 340/7.5, 7.22
See application file for complete search history.

(56) References Cited

U.S. PATENT DOCUMENTS

| 4,377,726 | A | | 3/1983 | Schiffbauer |
| 4,741,020 | A | | 4/1988 | Deal |
| 5,652,569 | A | | 7/1997 | Gerstenberger |
| 6,313,733 | B1 | * | 11/2001 | Kyte .................. 340/7.22 |

\* cited by examiner

*Primary Examiner*—Lee Nguyen

(57) ABSTRACT

An apparatus for communicating with one or more individuals, especially children, is disclosed. The apparatus comprises a transmitter and three receivers, allowing a parent or guardian to transmit radio signals to more than one child to give them messages. The transmitter has three-front mounted buttons and a two-position switch, enabling the transmitter to emit radio waves having one of six specific frequencies. Each receiver would be capable of picking up two of the six specific frequencies.

8 Claims, 1 Drawing Sheet

COMMUNICATION APPARATUS

This application claims the benefit of Provisional Application Ser. No. 60/308,464, filed Jul. 30, 2001.

BACKGROUND OF THE INVENTION

The present invention concerns that of a new and improved apparatus for use when locating one or more individuals, especially children.

DESCRIPTION OF THE PRIOR ART

U.S. Pat. No. 5,652,569, issued to Gerstenberger, discloses a child alarm with a parent's transmitter and a child's receiver which can be triggered manually by a parent.

U.S. Pat. No. 4,741,020, issued to Deal, discloses a clerk paging system that allows a customer to summon assistance by depressing a button that signals a storewide paging system.

U.S. Pat. No. 4,377,726, issued to Schiffbauer, discloses a paging system and means for voice communications.

SUMMARY OF THE INVENTION

The present invention concerns that of a new and improved apparatus for communicating with one or more individuals, especially children. The present invention comprises a transmitter and three receivers, allowing a parent or guardian to transmit radio signals to more than one child to give them messages.

There has thus been outlined, rather broadly, the more important features of an communication apparatus that the detailed description thereof that follows may be better understood and in order that the present contribution to the art may be better appreciated. There are, of course, additional features of the communication apparatus that will be described hereinafter and which will form the subject matter of the claims appended hereto.

In this respect, before explaining at least one embodiment of the communication apparatus in detail, it is to be understood that the communication apparatus is not limited in its application to the details of construction and to the arrangements of the components set forth in the following description or illustrated in the drawings. The communication apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present communication apparatus. It is important, therefore, that the claims be regarded as including such equivalent constructions insofar as they do not depart from the spirit and scope of the present invention.

It is therefore an object of the present invention to provide a communication apparatus which has all of the advantages of the prior art and none of the disadvantages.

It is another object of the present invention to provide a communication apparatus which may be easily and efficiently manufactured and marketed.

It is another object of the present invention to provide a communication apparatus which is of durable and reliable construction.

It is yet another object of the present invention to provide a communication apparatus which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Priority is hereby claimed to application 60/308,464, filed on Jul. 30, 2001.

Figure 1:
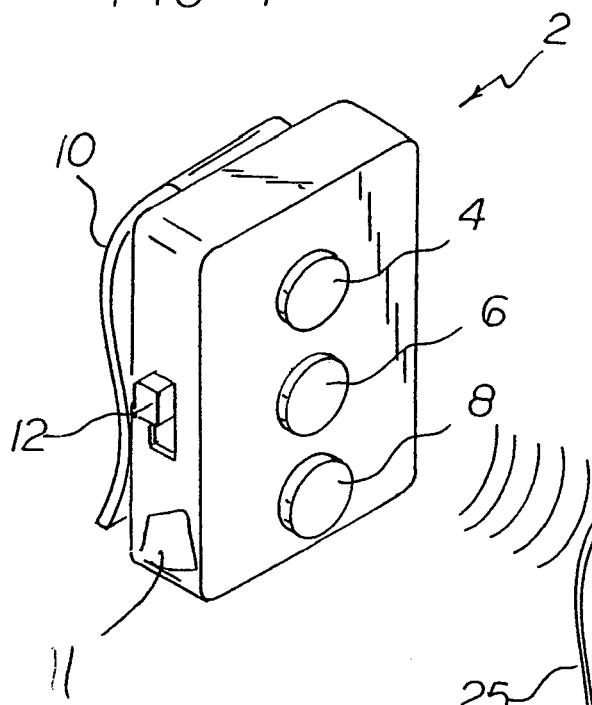
FIG. 1 shows a front view of a representation of a transmitter.

FIG. 1 shows a front view of a representation of a transmitter 2. Transmitter 2 would have a front side and a rear side, and would have buttons 4, 6, and 8 mounted on the front side of transmitter 2. The rear side of transmitter 2 would have a clip 10 attached, which would allow transmitter to be attached over a pant seam, shirt seam, belt, or other item of clothing. Transmitter 2 would have incorporated power means 11, preferably a battery.

Transmitter 2 also has a continuous side edge, to which it has attached switch 12. Switch 12 has two positions, the first position being a "call home" position, and the second position being a "come home" position.

Transmitter 2 would be capable of emitting radio waves of specific frequencies when the switch 12 would be in the "call home" position. If button 4 would be pressed, transmitter 2 would emit radio waves of a specific frequency, designated as frequency A. If button 6 would be pressed, transmitter 2 would emit radio waves of a specific frequency, designated as frequency B. If button 8 would be pressed, transmitter 2 would emit radio waves of a specific frequency, designated as frequency C.

Transmitter 2 would also be capable of emitting radio waves of specific frequencies when the switch 12 would be in the "come home" position. If button 4 would be pressed, transmitter 2 would emit radio waves of a specific frequency, designated as frequency D. If button 6 would be pressed, transmitter 2 would emit radio waves of a specific frequency, designated as frequency E. If button 8 would be pressed, transmitter 2 would emit radio waves of a specific frequency, designated as frequency F.

Figure 2:
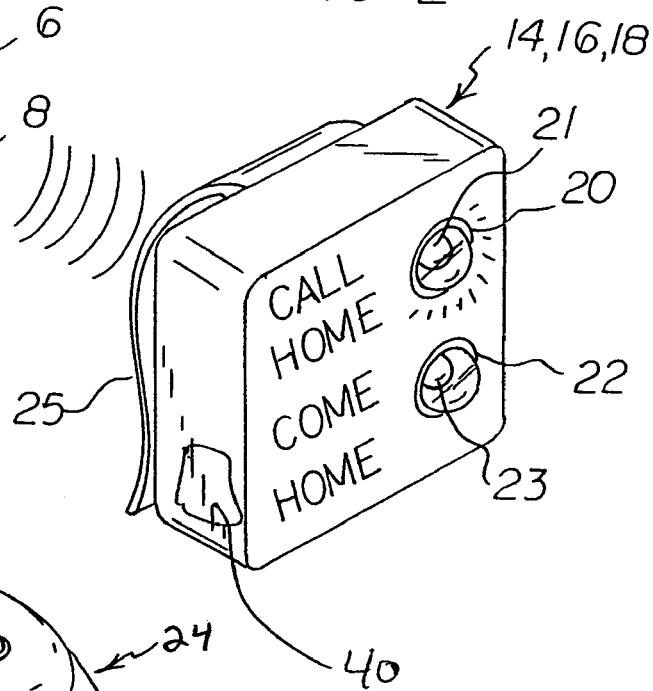
FIG. 2 shows a perspective representation view of a receiver as a clip-on receiver.

FIG. 2 shows a perspective representation view of receivers 14, 16, and 18 as a clip-on receivers. Each receiver has front-mounted buttons 20 and 22. Button 20 would have writing next to it indicating "call home," while button 22 would have writing next to it indicating "come home." Buttons 20 and 22 on each receiver would be transparent and would have lights 21 and 23, respectively, behind each button. Each receiver would have a clip 25 to allow each receiver to clip-on to a child's clothing or belt and would have an incorporated power means 40, preferably a battery.

Receiver 14 would be capable of receiving radio waves of frequencies A and D emitted from transmitter 2. If receiver 14 would pick up radio waves of frequency A emitted from transmitter 2, the "call home" button would light up. If receiver 14 would pick up radio waves of frequency D emitted from transmitter 2, the "come home" button would light up.

Receiver 16 would be capable of receiving radio waves of frequencies B and E emitted from transmitter 2. If receiver 16 would pick up radio waves of frequency B emitted from transmitter 2, the "call home" button would light up. If receiver 16 would pick up radio waves of frequency E emitted from transmitter 2, the "come home" button would light up.

Receiver 18 would be capable of receiving radio waves of frequencies C and F emitted from transmitter 2. If receiver 18 would pick up radio waves of frequency C emitted from transmitter 2, the "call home" button would light up. If receiver 18 would pick up radio waves of frequency F emitted from transmitter 2, the "come home" button would light up.

Figure 3:
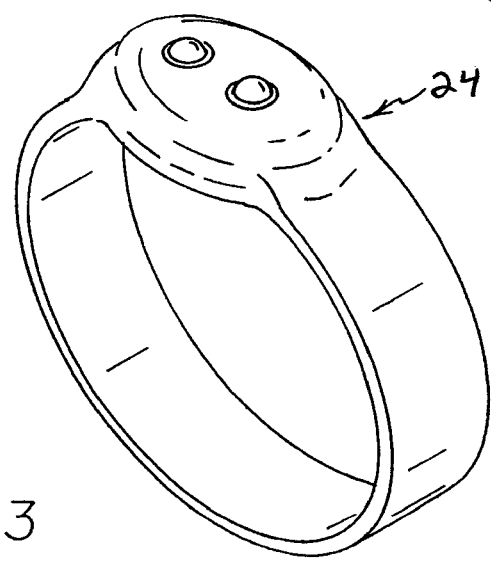
FIG. 3 shows a perspective representation view of a receiver as a bracelet receiver.

FIG. 3 shows a perspective representation view of a receiver of the present invention as a bracelet receiver 24 instead of a clip-on receiver. The bracelet receiver 24 would function in the same way as the receivers previously described, and would be designed to work with one specific button on transmitter 2.

I claim:

1. An apparatus for communicating with one or more individuals comprising:
    a radio wave transmitter having a pair of surfaces, a front surface and a rear surface, the transmitter also having a pair of sides, a first side and a second side,
    power means for providing power to the radio wave transmitter,
    means for attaching the transmitter to an item of clothing,
    means for enabling the transmitter to emit radio waves having one of six specific frequencies, the six specific frequencies designated as frequency A, frequency B, frequency C, frequency D, frequency E, frequency F,
    three receivers comprising a first receiver, a second receiver, and a third receiver, each receiver having two surfaces, a front surface and a rear surface, each receiver having a clip mounted on the rear surface, each receiver being capable of receiving two of the six specific frequencies of radio waves emitted from the transmitter, each receiver having a pair of front-mounted buttons located on the front surface of the receiver, a first button and a second button, each button having an incorporated light underneath it, the first button on each receiver having the words "CALL HOME" written next to it, the second button on each receiver having the words "COME HOME" written next to it, the first receiver capable of receiving frequencies A and D, the second receiver capable of receiving frequencies B and E, the third receiver capable of receiving frequencies C and F, and
    power means located within each receiver, for providing power to the receiver,
    wherein the means for enabling the transmitter to emit radio waves having one of six specific frequencies further comprises:
        three buttons located on the front surface of the transmitter, the three buttons comprising a first button, a second button, and a third button,
        a switch attached to the first side of the transmitter, the switch having two positions, a first position and a second position,
    wherein each of the three buttons, when depressed, would cause the transmitter to emit a specific frequency when the switch would be in the first position, and further wherein each of the three buttons, when depressed, would cause the transmitter to emit a specific frequency when the switch would be in the second position.

2. An apparatus for communicating with one or more individuals according to claim 1 wherein the transmitter would emit a radio waves of frequency A when the switch would be in the first position and the first button would be depressed.

3. An apparatus for communicating with one or more individuals according to claim 1 wherein the transmitter would emit a radio waves of frequency B when the switch would be in the first position and the second button would be depressed.

4. An apparatus for communicating with one or more individuals according to claim 1 wherein the transmitter would emit a radio waves of frequency C when the switch would be in the first position and the first button would be depressed.

5. An apparatus for communicating with one or more individuals according to claim 1 wherein the transmitter would emit a radio waves of frequency D when the switch would be in the second position and the first button would be depressed.

6. An apparatus for communicating with one or more individuals according to claim 1 wherein the transmitter would emit a radio waves of frequency E when the switch would be in the second position and the second button would be depressed.

7. An apparatus for communicating with one or more individuals according to claim 1 wherein the transmitter would emit a radio waves of frequency F when the switch would be in the second position and the third button would be depressed.

8. An apparatus for communicating with one or more individuals according to claim 1 wherein the means for attaching the transmitter to an item of clothing would further comprise a clip attached to the rear surface of the radio wave transmitter.

* * * * *